June 4, 1940. W. W. BOWERS 2,203,454
METHOD FOR LEACHING MEAT
Filed Sept. 8, 1938
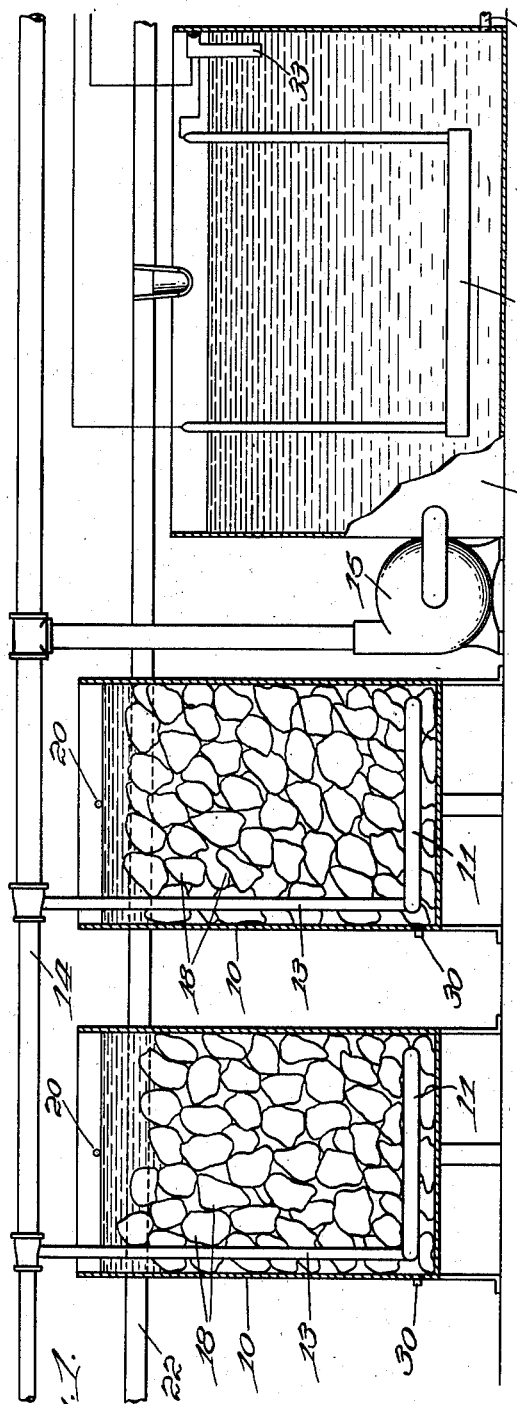
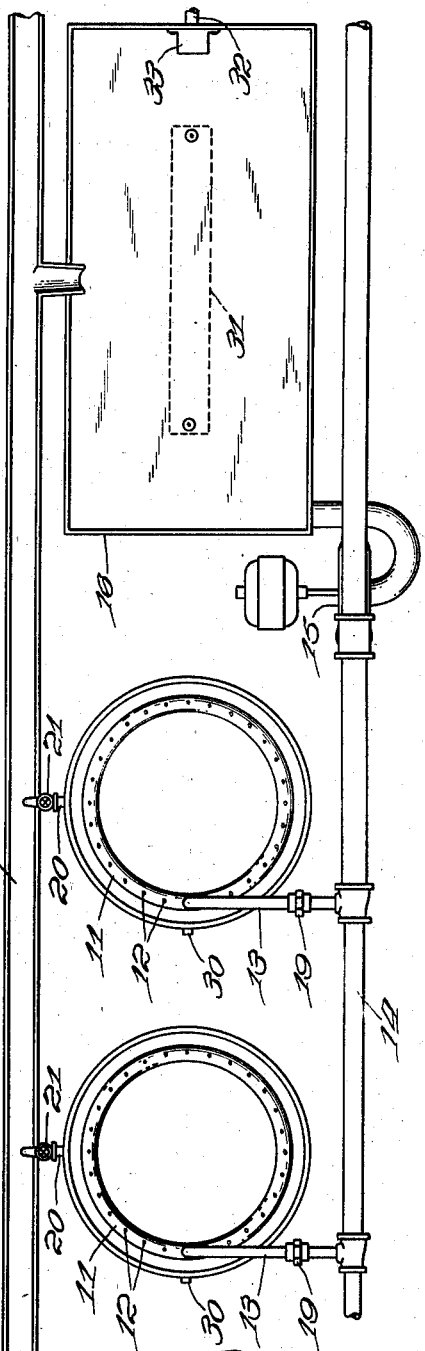
Fig. 1
Fig. 2
Inventor:
William W. Bowers.
By Chitton, Wilis, Davies, Hirschl, Dawson
Attys.

Patented June 4, 1940

2,203,454

UNITED STATES PATENT OFFICE 2,203,454

METHOD FOR LEACHING MEAT

William W. Bowers, Chicago, Ill., assignor to Wilson & Co., Inc., a corporation of Delaware Application September 8, 1938, Serial No. 229,001

7 Claims. (Cl. 99—107)

This invention relates to a method of and apparatus for leaching frozen meat products.

Prior to the present invention it was the custom in the packing industry to leach or thaw frozen meats by spreading the meats on racks in a room with a relatively higher temperature than that of the product. (Sometimes the meat was placed in a curing cellar having a temperature of from 36 to 40° F.—it would take approximately 48 to 72 hours to thaw meat in this fashion; sometimes the meat was placed in a leaching room in which the temperature was maintained at about 60 to 90° F.—it would take approximately 30 to 36 hours to thaw meat in this fashion.) Meat leached by this method had a high bacteria count, became slimy, and deteriorated in grade and quality from its original condition.

Another manner of leaching the frozen meat was to place the frozen meat in vats containing brine having a temperature in the range of 90 to 120° F. The meat was maintained in the vat for a period of about 39 to 54 hours. During the leaching operation the temperature of the brine would normally fall from its original temperature, namely, 90 to 120° F., to a temperature in the range of 33 to 35° F. After this treatment the meat was placed on racks in a curing room having a temperature of about 36 to 40° F. for a period of from two to three days in order to complete the thawing and to equalize the internal temperature of the product. Sometimes in order to hasten the leaching operation a steam hose would be inserted into the vat to raise the temperature of the brine back to the original temperature range, namely, 90 to 120° F. This would cut the leaching operation down to a period of 24 to 30 hours. The product was then placed in a curing room for 18 to 24 hours in order to secure a uniform temperature of between 36 to 40° throughout the meat.

These processes had many disadvantages. The length of time required was considerable, the high temperature involved contributed to bacterial spoilage in the outer portions of the meat, particularly in view of the long time required for the treatment. The meat products became definitely poorer in quality. Hams particularly became soft, flabby and less appetizing in appearance.

The high temperature employed in the brine, coupled with the long period of operation, further contributed toward breakdown of the meat product due to the very considerable temperature difference between the brine and the interior of the meat.

In accordance with the present invention a thawed meat product of considerably improved appearance having the original firmness and texture of the meat is produced in a much shorter length of time. Moreover, by at all times regulating the leaching operation to provide absolute uniformity, the meat products do not vary from day to day or even within the same batch. The new method likewise produces a more sanitary product, one which has a greater customer appeal and one which will bring a higher financial return.

An apparatus for carrying out the method is illustrated in the drawing in which—

Figure 1 represents somewhat diagrammatically an elevation of the leaching system and Figure 2 is a plan view thereof.

The apparatus comprises a plurality of leaching vats 10, each of which is provided at the bottom with a ring 11 provided with numerous closely spaced perforations 12. The ring is connected by the pipe 13 to the manifold 14 which is supplied with brine by the pump 15 connected to the brine reservoir 16. Each tank is provided with an overflow 20, which is provided with a valve 21, and discharges into the open trough 22 from which the overflow feeds by gravity back to the reservoir 16. A drain plug 30 is provided near the bottom of each vat. The brine reservoir is provided with a heating coil 31, an outlet 32 and a thermostat 33, which controls by any suitable means the amount of heat input into the heating coil.

The manifold 14 is graduated, being suitably, say, 2" in internal diameter at the maximum and ¾" at the farther portions, for a series of 20 vats arranged 10 on each side of the reservoir. The size of the vats is of considerable importance. The preferred vats are about 240 gals. capacity, which will hold about 1,000 lbs. of meat. If vats of considerably larger size are employed, much greater care must be exercised in procuring proper uniformity of leaching. In large tanks a plurality of overflows should be provided in order to maintain horizontal temperature uniformity. With a small tank the use of one overflow even at the side of the vat does not substantially interfere with the maintenance of horizontal uniformity in that portion of the tank or vat filled with meat.

In carrying out the method the reservoir 16 is filled with a leaching liquid which is preferably brine between 25° and 75° salometer. 25° to 50° brine is ordinarily employed. If the brine is too concentrated at times it will make the meat salty, whereas if it is too weak, it does not have the proper action in preventing bacterial growth.

The central reservoir should be large enough to provide an adequate supply of brine at the proper temperature. Normally, this should be 7 to 8 gals. per minute for each vat in the series. For 20 vats a central reservoir holding 1500 gals. has proved satisfactory.

In practice packers have their pickle or brine-making department on an upper floor of the building, above the curing cellar, so that the finished brine or pickle can be relayed to the curing room by means of gravity. By utilizing this feature in connection with the leaching operation herein described, a pipe leading from the pickle or brine-making room is attached to the manifold, the valve is opened, and when the battery of vats have been half filled with brine and the central reservoir has been completely filled this valve is shut off, the meat is then added to the vats half filled with brine, which then brings the brine level a little above the outflow pipe, and there is, of course, sufficient amount of brine in the reservoir to maintain this level throughout the leaching period. This pipe connection has not been shown, and is utilized generally only in filling the system. The used brine is discarded.

Brine in the reservoir is maintained at a temperature preferably between 34° F. and 50° F. and most suitably between 40° F. and 45° F. Ordinarily the thermostat is set for about 45°, and the brine is circulated at this temperature by the pump 15 into the manifold 14 and thence downwardly into the vats and out through the perforations 12 in the ring 11. The brine at this temperature rises upwardly around the meat 18, which practically fills the vats. In its passage the meat is warmed and the brine cooled, and the cooled brine then passes out the overflow 20 and returns through the trough 22 to the reservoir.

It has been discovered that the uniform distribution of the brine throughout the tank is quite essential in producing proper leaching of the meat. The introduction of the brine in a single stream has not been found to produce satisfactory leaching.

The amount of brine pumped is suitably 7 to 8 gals. per minute for a 240 gallon vat. If the rate is decreased the thawing is slower, and if it is increased considerably the thawing is not accelerated to any particular degree, while the meat product tends to become soft and flabby.

It is preferred that the overflow be visually controlled as by the valve 21 and the discharge into the open trough in order that the amount flowing through each tank may be equal to that flowing through the other tanks. With the present system a workman can readily gauge the proper amount by the size of the stream and will regulate to procure a stream of a given size. The presence of certain amounts of paper and loose fat, which comes from hams during the leaching process, is likely to interfere with ordinary leaching systems for regulating the overflow. The individual valves also provide means for varying the back pressure in each tank to make up for any inequalities in opening sizes or the head in the manifold 14.

Under the conditions hereinbefore set forth the meat, for example, hams, will be leached in a period of 20 to 24 hours. The meat product is removed from the batch when its internal temperature reaches 36° F. to 40° F. It may then be delivered to the curing cellar with its internal temperature quite uniform.

The inflow pipes 13 are connected to the manifold 14 by a box union fitting 19 and thus can easily be disconnected and cleaned.

The ring 11 is preferably a ½" internal diameter stainless steel pipe and the connections to it are likewise stainless steel.

The process is preferably used on pork products such as hams, shoulders and butts. It is also applicable to other meat products, however, such as frozen beef, mutton, or pork tongues, frozen beef rounds or other frozen meat. The time required for leaching and thawing will vary with the size of the product, but will generally be within the range of 20 to 24 hours.

The foregoing detailed description has been given for clearness of understanding only, and no unnecessary limitations should be understood therefrom, but the appended claims should be construed as broadly as permissible in view of the prior art.

I claim:

1. The method of leaching and thawing frozen meat which comprises immersing the frozen meat in a brine bath, continuously removing brine from the bath and supplying fresh brine thereto at a relatively higher temperature, and circulating the warmer brine uniformly upwardly about the meat while maintaining substantially uniform horizontal temperature conditions in the bath.

2. The method as set forth in claim 1, in which the temperature of the warm brine is from 34° F. to 50° F.

3. The method as set forth in claim 1, in which the temperature of the warm brine is from 40° F. to 45° F.

4. The method as set forth in claim 1, in which the warmer brine is at a temperature of approximately 40° F. to 45° F. and in which it is supplied at a rate sufficient to maintain a temperature substantially in the range of 40° F. to 45° F. in the bath.

5. The method of leaching large quantities of frozen meat which comprises immersing the meat in a plurality of brine baths of relatively small size, continuously removing brine in an overflow stream from each of said baths and supplying warmer brine thereto in an upwardly direction about the meat, and equalizing the heat input to each of the baths by visually regulating the size of the overflow stream therefrom.

6. The method of leaching frozen meat, which comprises immersing the frozen meat in a brine bath of relatively small size, supplying brine thereto at a temperature between 34° F. and 50° F. and at a rate to maintain the temperature of the bath approximately in the same range, circulating the brine uniformly and in a generally upward direction about the meat, and removing excess brine from the bath to effect uniform leaching of the meat while maintaining a firm meat product.

7. The method as set forth in claim 1, in which the meat is a frozen pork product.

WILLIAM W. BOWERS.